July 29, 1969 W. F. WATSON 3,457,641

METHOD OF MANUFACTURING A TAPE FOR PROVIDING
CODED ELECTRICAL SIGNALS
Filed May 24, 1967

INVENTOR.
WILLIAM F. WATSON
BY
Anthony J. Casco
AGENT

United States Patent Office 3,457,641

Patented July 29, 1969

3,457,641

METHOD OF MANUFACTURING A TAPE FOR PROVIDING CODED ELECTRICAL SIGNALS

William F. Watson, Fairlawn, N.J., assignor to The Bendix Corporation, a corporation of Delaware Filed May 24, 1967, Ser. No. 641,042
Int. Cl. B41m 3/08; B44d 1/18; H05k 3/00
U.S. Cl. 29—625 10 Claims

ABSTRACT OF THE DISCLOSURE

A method of manufacturing an elongated tape for providing electrical signals corresponding to a variable condition including the steps of applying a plurality of metallic bits to a backing in accordance with a predetermined code and applying a dielectric film over the bits. Electrical signals may be provided upon the presence or absence of the metallic bits being detected by suitable electrical condition sensing equipment as the tape moves longitudinally relative thereto.

CROSS REFERENCE TO RELATED APPLICATIONS

A tape manufactured by the present invention may be used with an Electrostatically Digital Tape Display Means such as disclosed and claimed in a copending U.S. application Ser. No. 406,680, filed Oct. 27, 1964 by Alfred E. Levine and assigned to The Bendix Corporation, assignee of the present invention.

BACKGROUND OF THE INVENTION

Field of the invention

This invention relates to a method of manufacturing tapes for use in display systems and, more particularly, to a tape for providing electrical signals when the tape moves longitudinally in response to sensed variations in a predetermined condition. More particularly, this invention relates to a method for manufacturing the tape so that the electrical signals are provided with maximum accuracy.

Description of the prior art

Aircraft control display systems such as the system disclosed and claimed in the aforenoted copending U.S. application Ser. No. 406,680 include a tape for providing electrical signals as the tape moves longitudinally in accordance with the displacement of the craft from a predetermined reference. Methods of the kind which have heretofore been used for manufacturing such flexible circuits are inadequate for providing the tape of the present invention, sinch the tape is long and has unusual accuracy requirements.

SUMMARY OF THE INVENTION

The method of the present invention relates to the manufacture of a tape including a thin flexible backing having a predetermined length and a predetermined width substantially uniform throughout said length. A plurality of metallic bits are precisely disposed laterally and longitudinally on the backing in the form of a coded pattern, with the coded pattern being in substantial alignment with the longitudinal edges of the backing. A dielectric film of uniform thickness overlies the metallic bits. The tape thus manufactured by the method of the present invention is such that electrical signals provided across the width of the tape may be detected by suitable electrical condition sensing equipment as the tape moves longitudinally relative thereto.

One object of this invention is to provide a method for manufacturing tapes of unusual length for effecting electrical signals in accordance with a predetermined code as the tape moves longitudinally.

Another object of this invention is to provide a method for manufacturing a tape of the kind described including a thin flexible backing having a pattern of metallic bits disposed thereon in accordance with a predetermined code for providing electrical signals.

Another object of this invention is to provide a method to dispose the metallic bits laterally and longitudinally on the backing in accordance with the predetermined code so that electrical signals may be provided as the presence and absence of the metallic bits across the width of the backing is sensed upon movement of the tape longitudinally relative to suitable electrical condition sensing equipment.

Another object of this invention is to provide a novel method for manufacturing a tape of the kind described so that the metallic bits are precisely disposed on the backing for providing the electrical signals with maximum accuracy.

These and other objects and features of the invention are pointed out in the following description in terms of the embodiment thereof which is shown in the accompanying drawings. It is to be understood, however, that the drawings are for the purposes of illustration only and are not a definition of the limits of the invention, reference being had to the appended claims for this purpose.

DESCRIPTION OF THE INVENTION

Figure 1:
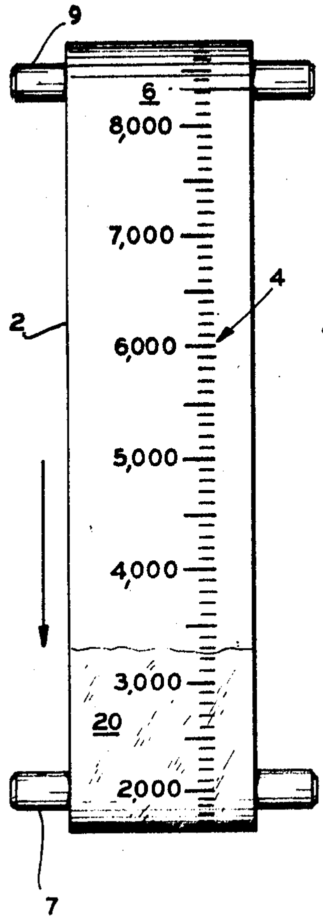
FIGURE 1 is a pictorial representation showing one side of a tape constructed by the method of the present invention, and which one side includes a functional scale thereon.
Figure 2:
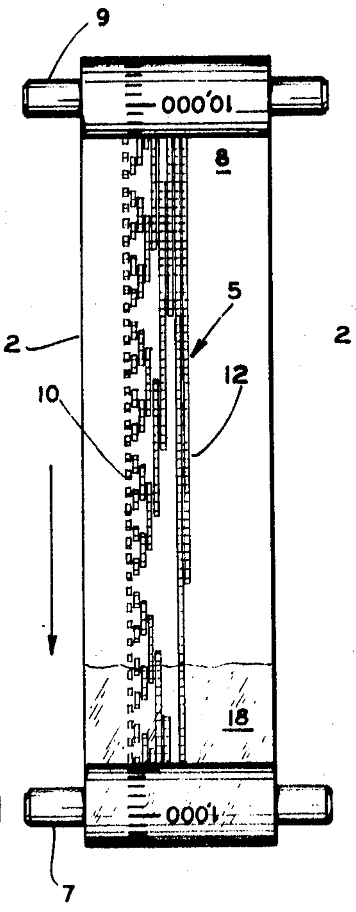
FIGURE 2 is a pictorial representation showing the other side of the tape constructed according to the invention, and which other side includes a plurality of metallic bits arranged in a coded pattern corresponding to the functional scale on the one side of the tape.
Figure 3:
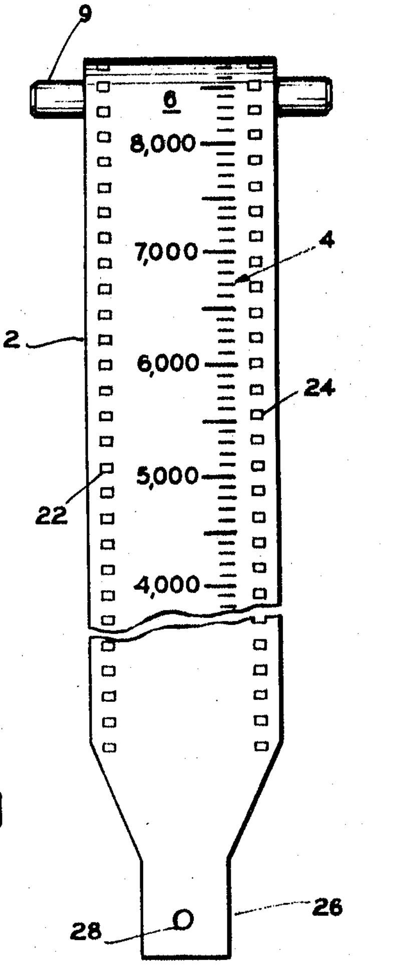
FIGURE 3 is a pictorial representation showing the tape of FIGURES 1 and 2 having a tape termination and including perforations along the longitudinal edges thereof for engaging tape driving means.

With reference to FIGURES 1, 2 and 3 there is shown a tape manufactured in accordance with the method of the present invention for use in a display system for controlling an aircraft. The tape includes a backing 2 having a functional scale 4 on one side 6 thereof, as shown in FIGURE 1, and with the other side 8 of the backing 2 having a coded pattern 5 thereon, and which coded pattern 5 includes a plurality of metallic bits such as the bits 10 and 12 disposed laterally and longitudinally in accordance with the functional scale 4. In this connection it is to be noted that the side 6 of the backing 2 having the functional scale 4 thereon is known as the presentation side of the tape and the side 8 having the coded pattern 5 thereon is known as the coded side. The tape is mounted on spools 7 and 9, and which spools 7 and 9 are suitably driven by means not shown so that the tape moves longitudinally in the direction of the arrows.

A film 18 of a suitable insulating material overlies the coded pattern 5 on the coded side 8 of the backing 2, and which insulating film 18 is shown in FIGURE 2, for purposes of illustration, as extending only partially along the length of the coded side 8. The presentation side 6 of the backing 2 has a film 20 of a suitable protective material overlying the functional scale 4 thereon, and which film 20 protects the functional scale 4 from deterioration due to dirt or other foreign matter. The film 20 is shown for purposes of illustration as extending only partially along the length of the presentation side 6.

With reference to FIGURE 3, the longitudinal edges of the tape are shown having perforations such as the perforations designated by the numerals 22 and 24. The perforations are provided in the event that sprocket mechanisms are used for driving purposes, and in which event the sprocket engages the perforations and drives the tape in the direction of the arrows.

There is also shown in FIGURE 3 a tape termination including a tail 26 and a mounting hole 28 for mounting the tape through a suitable fastening device to the spool 7 shown in FIGURES 1 and 2. In this connection, it is to be noted that the other end of the tape, which other end is not shown, has a tape termination similar to that shown in FIGURE 2 for mounting the tape to the spool 9 shown in FIGURES 1, 2 and 3.

Thus, as the spools 7 and 9 are driven in accordance with the displacement of the aircraft from the predetermined reference, or as a sprocket mechanism engages the perforations 24 and 26 along the longitudinal edges of the tape, the tape moves longitudinally in the direction of the arrows and the presence and absence of the metallic bits such as the bits 10 and 12 across the width of the backing 2 is sensed for providing corresponding electrical signals as described in the aforenoted copending U.S. application Ser. No. 406,680.

It is evident, then, that to prevent spurious signals from being provided the metallic bits such as the bits 10 and 12 included in the coded pattern 5 must be accurately disposed on the backing 2 and must be precisely separated from adjacent bits. The perimeter of the bits must be clean and sharp and the separations between each bit and its adjacent bits must not exceed ten percent of the bit area. To insure accurate sensing of the presence and absence of the bits, the alignment of the coded pattern 5 with the longitudinal edges of the backing 2 must be kept to a maximum run out of .002 inch and the insulating film 18 on the coded side 8 of the tape must present an absolutely plane surface devoid of any imperfections. The method of manufacturing the tape in accordance with the present invention insures that these conditions are met.

The material for the backing 2 must have several important properties. First among these is that the material must have good energy absorbing characteristics, i.e., the material must be a good electrical insulator and must be unaffected by relatively high processing temperatures. The material must also be of a nature so as not to distort during the various steps of the process. If otherwise were the case it would be impossible to apply the coded pattern 5 with the required precision as will hereinafter become evident. By way of example a material possessing the aforementioned properties and otherwise found suitable for the purposes of the invention is a plastic film having a polyimide form of molecular structure and marketed by the Du Pont Corporation under the trade name of "Kapton." The material is provided in 500 foot rolls and is 12 inches wide and .002–.003 inche thick.

Thus in the method of the present invention the aforenoted plastic film may be cut into suitable lengths, for example, 500 foot rolls of suitable processing widths. The film is unwound and cut into strips of approximately 45 millimeters in width by apparatus of the rotary shear type which has been suitably modified for purposes of the present invention, with each such strip being rewound on a separate spool for further processing.

There is applied to one side of a 45 millimeter wide strip a deposit about .000050 inch thick of a suitable conductive metal such as copper. The copper deposit may be applied by vacuum deposition processes well known in the art, and wherein the strips are transported at high speed through a high temperature-high vacuum chamber with pure copper being sputtered on the strip and adhering thereto by molecular attraction for providing on said strip a smooth homogeneous surface of copper.

In the event that the tape is to be applied where a sprocket mechanism is used for driving purposes as heretofore noted, the 45 millimeter coppered strips are perforated using perforating equipment of conventional type, so as to provide perforations such as the perforations 22 and 24 shown in FIGURE 3. In this connection it is to be noted that, depending on the application, the perforations may be provided along both longitudinal edges of the strip as shown in FIGURE 3, or along only one of said edges.

The coppered strips are next cut into appropriate lengths in accordance with the length of tape being fabricated so as to provide the backing 2 shown in FIGURES 1, 2 and 3. These lengths may vary from 12 to 130 inches depending on the application of the final tape, with the individual lengths of backing being wound on mandrels so that one of the edges of the backing is presented for sizing. To insure that the backing 2 has a uniform width and the longitudinal edges thereon are parallel for proper alignment of the coded pattern 5, the backing 2, wound on a mandrel, as heretofore noted, is lapped by gently rubbing said one edge on a fine grade of abrasive paper. With one of the edges so lapped, the backing 2 is reverse wound on the mandrel, i.e., the other edge of the backing is presented for sizing, and said other edge is lapped in a similar manner. The alternate sizing of first one and then the other edge of the backing 2 is continued until the two edges are within the predetermined degree of parallelism and the width of the backing is uniform throughout its entire length. By lapping both edges of the backing 2 irregularities in said edges tend to cancel each other out and a higher degree of parallelism and width uniformity is possible than would otherwise be the case.

The copper surface of the backing 2 is prepared for receiving a coating of a photo sensitive lacquer. The backing 2 is wound on a spraying drum, and the static charge removed from the backing by rotating the drum past an ionization type static eliminator so as to prevent static adherence of dust particles and other forms of contamination to the backing 2. The copper surface of the backing 2 is scoured with a suitable solvent such as methyl ethyl ketone to remove surface contamination. Surface moisture is removed from the cleaned backing 2 by rotating the spraying drum past a suitable heat source, such as a bank of infrared lamps.

A photosensitive lacquer found suitable for the purposes of the present invention is a product manufactured by the Eastman-Kodak Company and marketed as "Kodak Photo-Resist, Type 2." The photosensitive lacquer is mixed with a thinner, also an Eastman Kodak Company product and marketed as "Kodak Ortho Resist Thinner," with the ratio of lacquer to thinner being approximately 1 to 1.15 by volume. In this connection it is to be noted that the aforenoted proportions were established by considering that the photosensitive lacquer mixture must have a viscosity to permit subsequent spraying thereof on the copper surface of the backing 2 with as little pressure as possible so as to prevent "bounce back" of lacquer particles thereby insuring a uniform lacquer film. The viscosity of the mixture is checked prior to each application to insure that it is within predetermined limits, and further, the mixture is filtered prior to each application using conventional filtering equipment including a one micron filter to remove any accumulated contamination.

The photosensitive lacquer is sprayed on the copper surface of the backing 2 with an artist's air brush modified for purposes of the invention. The resulting coating presents a substantially plane surface with a thickness between .0004–.0005 inch and having no sags, runs, or other imperfections thereon. The backing is removed from the spraying drum, and after a flash-off period of about 30 minutes at room temperature, is placed on a drying rack and baked at 150° F. for 30 minutes. The flash-off period and subsequent baking provide initial evaporation of the thinner in the photosensitive lacquer mixture, with this evaporation being completed, then the backing is stored in vented light proof containers for a period of at least two weeks.

Subsequent to the aforenoted storage period, the photosensitized backing 2 is exposed through a master to a light source. The master has a pattern of opaque and transparent sections, with the transparent sections corresponding to the metallic bits in the coded pattern 5 shown in FIGURE 2. The master is positioned on an exposing frame which is circular in shape and has a circumferential length corresponding to the length of the master. The backing 2 is positioned on the exposing frame with the photosensitized surface thereof in contact with the master. An inflatable rubber tube is positioned over the backing 2 and restraining rings are installed to secure the master, the backing 2 and the inflatable rubber tube on the exposing frame. Air pressure of approximately 8 p.s.i. is slowly applied to inflate the rubber tube, whereupon the photosensitized backing is urged into intimate and uniform contact with the master to insure that the pattern on the master is precisely transferred to the backing 2 during exposure. The exposure is accomplished by activating a bank of ultra violet lamps arranged around the circumference of the exposing frame for a period of about 3.5 minutes, after which the rubber tube is deflated, the restraining rings removed and the exposed backing removed from the exposing frame.

The exposed backing is wound on a spiral wind developing and etching jig, and the jig is immersed in a tank containing a suitable developer fluid which, for purposes of example, may be a product manufactured by the Eastman Kodak Company and marketed as "Kodak Ortho Resist Developer," and agitated therein for a period of about 3 minutes, after which the jig is allowed to drain for a period of about 1 minute prior to flushing with a high volume, low pressure water spray. After flushing, the jig is rinsed with distlled water to remove any accumulated contamination. The jig is next immersed in a tank containing a suitable chemical etchant which, for purposes of example, may be ferric chloride (Fe Cl), and agitated therein during a 20 second interval, after which the jig is again water flushed and rinsed with distilled water.

Starting with immersion in the developer fluid the unexposed photo sensitive lacquer areas of the backing 2 (those areas where the opaque sections of the master prevented impingement of ultra violet light) are softened by the developer. The exposed lacquer areas (those areas where the transparent areas of the master permitted impingement of ultra violet light, and which areas correspond to the metallic bits 10 and 12 in the coded patterns 5) are hardened by the ultraviolet light protecting the copper underneath. The softened lacquer areas are washed away during flushing, leaving the copper underneath unprotected, and which unprotected copper is attacked by the etchant. The backing 2 is removed from the developing and etching jig and wiped to remove surface moisture. The hardened photosensitive lacquer is removed by wiping the surface thereof with a suitable stripper such as methyl ethyl ketone, after which the backing 2 is dried, with the coded pattern 5 being thus formed.

The overlying insulating film 18 is next applied to the coded side 8 of the tape. The insulating film 18 may, for purposes of example, be an epoxy material mixed with an appropriate thinner, with the ratio of epoxy to thinner being approximately 3 to 1 by volume. In this connection it is to be noted that the aforenoted proportion was established by considering that the mixture must have a viscosity to permit subsequent spraying with as little pressure as possible to prevent "bounce back" of epoxy particles and to insure a uniform epoxy film. The viscosity of the mixture is checked prior to each application and the mixture is filtered using standard filtering equipment including a one micron filter to remove any accumulated contamination.

Prior to applying the insulating film 18, the backing 2 is transported past an ionization type static eliminator to prevent static adherence of contaminating particles, wiped with methyl ethyl ketone to remove surface contamination and mildly heated for drying purposes. The epoxy mixture is then sprayed over the coded pattern 5 on the coded side 8 of the backing 2 using an artist's air brush modified for purposes of the invention. The resulting film 18 presents a substantially plane surface approximately .0004 to .0006 inch thick and without any surface imperfections which might cause spurious signals when the tape is installed for use.

The presentation side 6 of the backing 2, having the functional scale 4 thereon shown in FIGURE 1, is next prepared. The backing 2 is wound on a spraying drum and all appropriate areas are suitably masked. A background paint is sprayed on the backing 2 with conventional paint spraying equipment, with the paint providing a background for the subsequent application of numerals, graduations or other symbolization as shown in FIGURE 1. In this connection it is to be noted that in order to insure that the paint is of the proper viscosity for spraying so as to provide a uniform surface and that it is free from contamination, prior to each application the viscosity of the paint mixture is checked and the paint is suitably filtered. Subsequent to applying the paint, the backing 2 is removed from the spraying drum and installed on a drying jig, which is placed in an oven whereby the paint is dried for a period of about 45 minutes at 180° F. The resulting background paint film is approximately .001 inch thick.

The numerals and graduations such as shown in FIGURE 1 are next superimposed on the background paint. This is accomplished by using conventional means well known in the art such as, for example, the silk screen process. For long tapes, the silk screening is done in sections, with each section being baked in a vacuum oven for approximately 30 minutes at 180° F. to assure drying of the symbolization before proceeding with the next section.

With the presentation side 6 of the backing 2 thus provided, the protective film 20, which may be an aqueous dispersion of nylon having a predetermined viscosity and filtered to remove contamination, is sprayed on the side 6 of the backing 2 using conventional spraying equipment. The resulting film is approximately .0003 inch thick and serves to protect the functional scale 4 from deterioration due to dirt and other foreign matter as heretofore noted.

The tape is now cut into its final width. The cutting operation must be performed with the utmost degree of precision since the overall width dimension of the backing 2 must be held to a tolerance of +.000, −.002 inch, and the coded pattern 5 must be positioned relative to the longitudinal edges of the backing 2 to a dimension held to a ±.002 inch tolerances. The operation is performed on a commercial rotary shear type cutter modified to accommodate the aforementioned accuracy requirements.

As hertofore noted, it is imperative that the dielectric film 18 on the coded side 8 of the backing 2 presents a substantially plane surface with no imperfections thereon. In order to insure this, the coded side 8 of the backing 2 is lapped by laying the backing 2 on a work table and charging a felt pad with a suitable lapping compound. The felt pad is gently rubbed over the dielectric film 18 until all surface imperfections are removed. The lapped surface is then washed with an aqueous soap solution, mounted on a jig and cleaned in an ultrasonic cleaning unit for approximately 15 minutes. After ultrasonic cleaning, the tape is removed from the jig, dried and wiped with a suitable solvent such as Freon.

The tape is next subjected to functional testing. This is accomplished by winding the tape on reels and arranging the reels so that the tape moves longitudinally at a speed corresponding to actual operating conditions. A sensing device is aligned with the coded pattern 5 on the coded side 8 of the tape and senses the presence and absence of the metallic bits such as the bits 10 and 12 across the width of the tape, with a visual indication thereof being provided on readout lights.

The termination ends including the tails 26 and the mounting holes 28 are next formed on the tape by suitably cutting the ends thereof, after which the mounting holes 28 are punched on the tails 26 to provide a configuration as shown in FIGURE 3. The tape of the present invention, thus completed, is wound on storage reels and stored until used.

In connection with the foregoing description of the method of manufacturing the tape of the present invention, it is to be noted that while commercially available apparatus is employed, modification of this apparatus is necessary to accommodate the unusual accuracy requirements of the tape. Thus, incorporated into such apparatus are special reeling fixtures, alignment devices, transporting systems and the like. Of particular note is the exposing frame heretofore referred to, and which exposing frame in cooperation with the inflatable rubber tube is able to accommodate unusual lengths of tape to insure precise transfer of the master pattern to the backing of the tape.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A method of manufacturing a tape for providing electrical signals in accordance with a predetermined code as the tape moves longitudinally, comprising the steps of:

cutting an indeterminant length of thin flexible material having suitable insulating and heat absorbing characteristics into strips of predetermined processing widths;

cutting said strips into predetermined lengths for providing a backing;

sizing the backing so that the width thereof is substantially uniform throughout the length and the longitudinal edges are substantially parallel;

disposing a plurality of metallic bits laterally and longitudinally on the backing for forming a pattern in accordance with the predetermined code, and for providing the electrical signals when the presence and absence of the metallic bits across the width of the tape is sensed;

applying an insulating film over the metallic bits; and lapping the insulating film so that said insulating film is free of surface imperfections and is of a uniform thickness.

2. A method as described by claim 1, wherein the step of disposing a plurality of metallic bits laterally and longitudinally on the backing for forming a pattern in accordance with the predetermined code includes the steps of:

after cutting the material into strips of predetermined processing widths, applying to one side of the cut strip a smooth homogeneous surface of a suitable electrically conductive metal;

after sizing the backing so that the width thereof is substantially uniform throughout the length and the longitudinally edges are substantially parallel, cleaning the metalic surface on the backing;

applying a suitable mixture of a photosensitive lacquer and a solvent over the metallic surface;

evaporating the solvent in the photosensitive mixture;

exposing the photosensitive lacquer on the backing through a master having a plurality of opaque areas and having a plurality of transparent areas corresponding to the metallic bits to a source of light energy;

immersing the exposed backing in a suitable developing solution for softening the unexposed areas of the photosensitive lacquer corresponding to the opaque areas of the master;

flushing the developed backing in water for washing away the softened areas of photosensitive lacquer and for leaving the metallic areas underneath unprotected;

immersing the fixture in a suitable etchant solution for etching away the unprotected metallic areas; and stripping the exposed areas of photosensitive lacquer corresponding to the transparent areas of the master for exposing the metallic areas underneath.

3. A method as described by claim 2 wherein the step of exposing the photosensitive lacquer on the backing through a master having a plurality of opaque areas and having a plurality of transparent areas corresponding to the metallic bits to a source of light energy includes the steps of:

positioning the backing on a circular exposing frame having a circumferential length substantially that of the backing;

positioning the master so that said master is in contact with the photosensitive lacquer on the backing;

positioning an inflatable tube over the master;

securing the backing, the master and the inflatable tube in the exposing frame;

inflating the tube for urging the master into intimate, uniform contact with the photosensitive lacquer on the backing;

exposing the master and the backing to a source of light energy for a predetermined period of time;

deflating the tube; and removing the tube, the master and the backing from the exposing frame.

4. A method as described by claim 1 wherein the step of sizing the backing so that the width thereof is substantially uniform throughout the length and the longitudinal edges are substantially parallel includes the steps of:

winding the backing on a suitable fixture for presenting one edge of said backing for sizing;

lapping said one edge of the backing by gently rubbing the backing on a suitable abrasive substance;

reverse winding the backing on the fixture so that the other edge of the backing is presented for sizing;

lapping the other edge of the backing by gently rubbing said other edge on the suitable abrasive substance.

5. A method as described by claim 2 wherein, before the step of applying a suitable mixture of photosensitive lacquer and a solvent over the metallic surface there are included the steps of:

removing the static charge from the metallic surface for preventing static adherence of contaminating particles thereto;

cleaning the metallic surface with a suitable solvent to remove surface contamination; and heating the backing for removing residual moisture therefrom.

6. A method as described by claim 2 wherein the step of applying a suitable mixture of a photosensitive lacquer and a solvent over the metallic surface includes the steps of:

mixing the photosensitive lacker and the thinner in predetermined proportions;

checking the viscosity of the mixture to insure that said viscosity is within predetermined limits;

filtering the mixtuer to remove contamination; and spraying the mixture over the metallic surface.

7. A method as described by claim 2 wherein the step of evaporating the solvent in the photosensitive mixture includes the steps of:

storing the photosensitized backing for an initially relatively short period at room temperature;

baking the photosensitized backing at a predetermined temperature for a relatively short period; and storing the photosensitized backing in vented light proof containers for a relatively long period.

8. A method as described by claim 1 wherein the step of applying an insulating film over the metallic bits includes the steps of:

mixing a suitable insulating material with a thinner so that the mixture has a predetermined viscosity;
checking the viscosity of the mixture;
filtering the mixture to remove contamination;
removing the static charge from the backing for preventing static adherence of contaminating particles;
cleaning the backing to remove surface contamination;
heating the backing to remove residual moisture; and
spraying the mixture over the metallic bits.

9. A method as described by claim 1 including the steps of:

applying a functional scale to the backing;
winding the backing on a drum;
masking predetermined areas of the backing;
applying a coating of background paint to the area of the backing which receives the functional scale;
drying the coating of paint;

superimposing symbolization and graduations over the background paint;
drying the symbolization and graduations; and
applying a protective film over the symbolization and graduations.

10. A method as described by claim 1 wherein the step of lapping the insulating film so that said insulating film is free of surface imperfections and is of a uniform thickness includes the steps of:

charging a felt pad with a suitable lapping compounds;
rubbing the felt pad over the insulating film;
cleaning the backing; and
drying the backing to remove residual moisture.

References Cited

UNITED STATES PATENTS 2,923,642 2/1960 Hausen --------- 179—100.24

JOHN F. CAMPBELL, Primary Examiner
ROBERT W. CHURCH, Assistant Examiner

U.S. Cl. X. R.

29—627; 117—64, 212; 235—61.11, 61.12; 264—341; 340—173; 346—134